March 6, 1956  N. MOURAVIEFF  2,737,274
FREE-WHEEL DEVICE
Filed Nov. 23, 1951  3 Sheets-Sheet 1
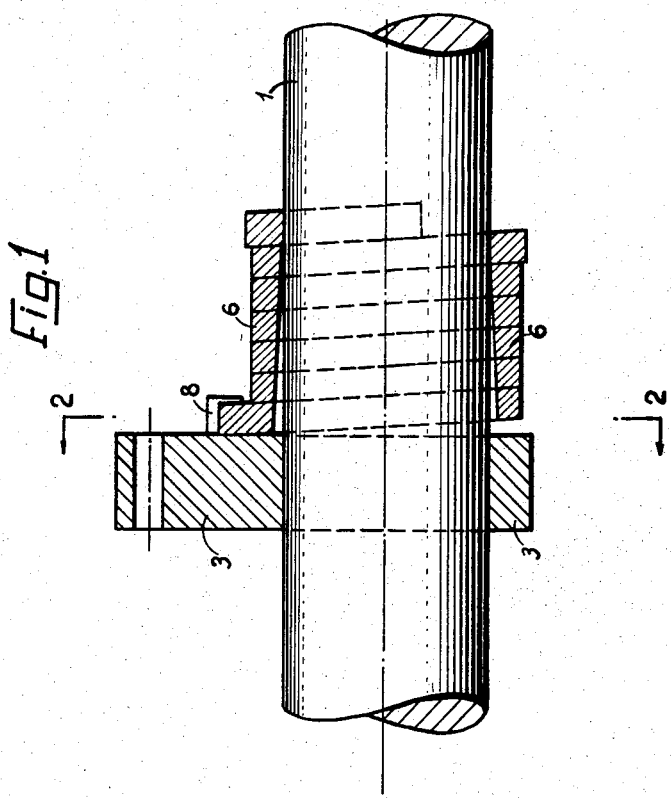
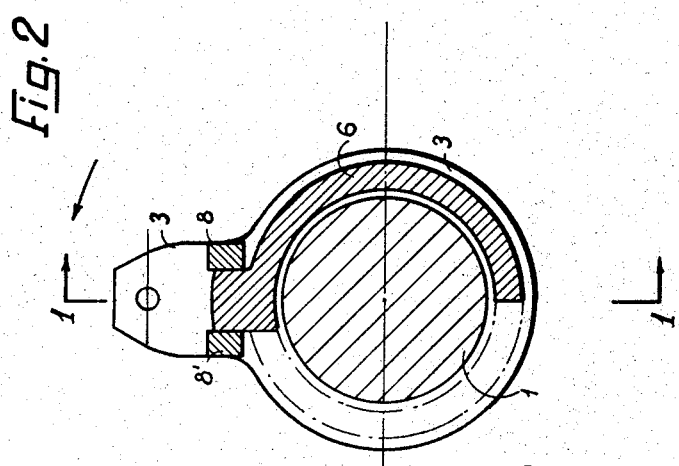
Inventor
N. Mouravieff
By Elliott Downing Peebles
Attys.

March 6, 1956  N. MOURAVIEFF  2,737,274
FREE-WHEEL DEVICE

Filed Nov. 23, 1951  3 Sheets-Sheet 2

Inventor
N. Mouravieff

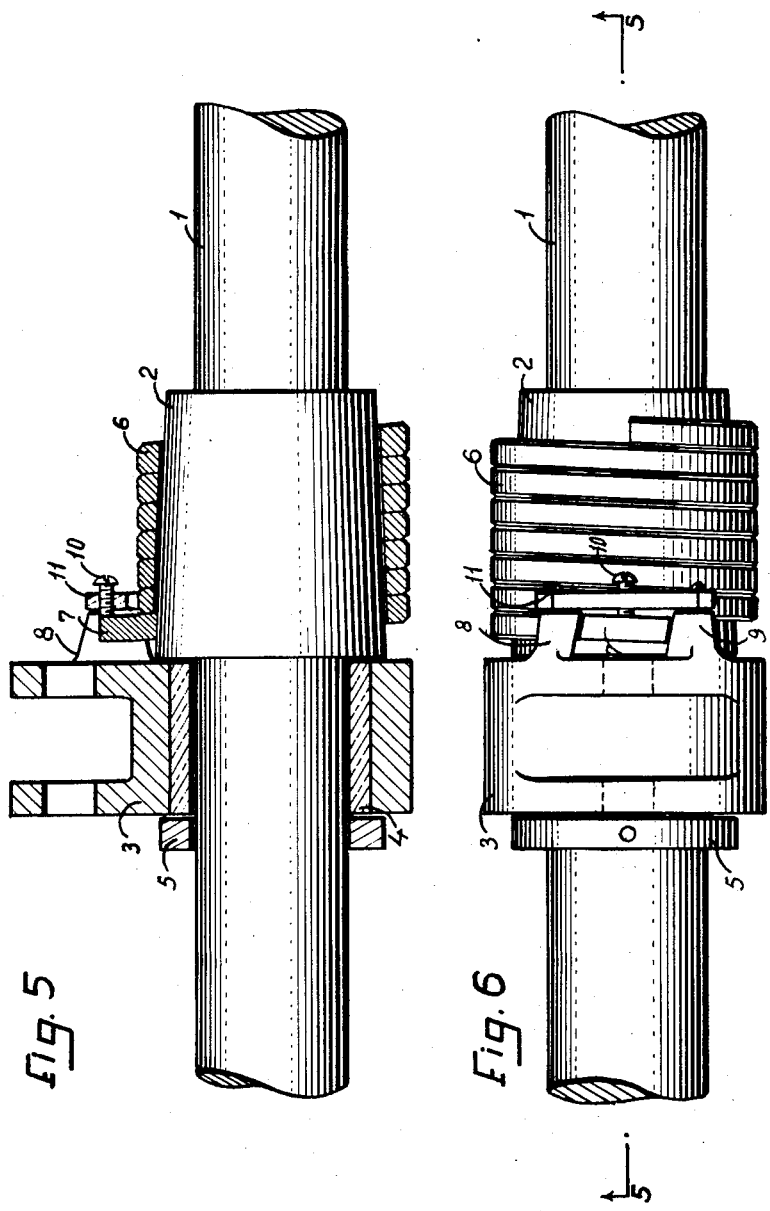

United States Patent Office 2,737,274
Patented Mar. 6, 1956

2,737,274

FREE-WHEEL DEVICE

Nicolas Mouravieff, Grasse, France

Application November 23, 1951, Serial No. 257,926

Claims priority, application France December 6, 1950

3 Claims. (Cl. 192—41)

This invention relates to a one-way driving device which will be called hereinafter a "free-wheel device."

The main object of the invention is to provide a free-wheel device offering a maximum torque-transmitting power and capable of ensuring a succession of coupling and decoupling operations at a very high frequency without any appreciable wear.

The free-wheel according to the invention is essentially constituted by a helical spring anchored at one end on a driving member and wound around a driven shaft coaxial with said driving member, the inner peripherical surface of said spring considered as a whole being frusto-conical with a diameter decreasing towards the free end of the spring, while the cross-section of the spring wire increases towards said free end, said spring exerting at least along its end portion a clamping action on the shaft.

Now, it is clear that the clamping action of the spring should have at rest a sufficient valve to ensure coupling even with considerable torques, while introducing no prohibitive friction losses in the free conditions of relative rotation between the shaft and the spring.

Another object of the invention is to provide a free-wheel device of the type described in which the initial value of the clamping action of the spring upon the driven shaft is adjustable.

In these drawings:

Fig. 1 is an axial longitudinal section of an embodiment of the free-wheel device according to the invention along line 1—1 of Fig. 2.

Fig. 2 is a cross-section of the device of Fig. 1 along line 2—2 of Fig. 1.

Fig. 5 is a similar view of another alternative embodiment.

Fig. 6 is a plan view of the device of Fig. 5.

In all figures, the similar elements have been designated by the same reference numerals.

Figure 3:
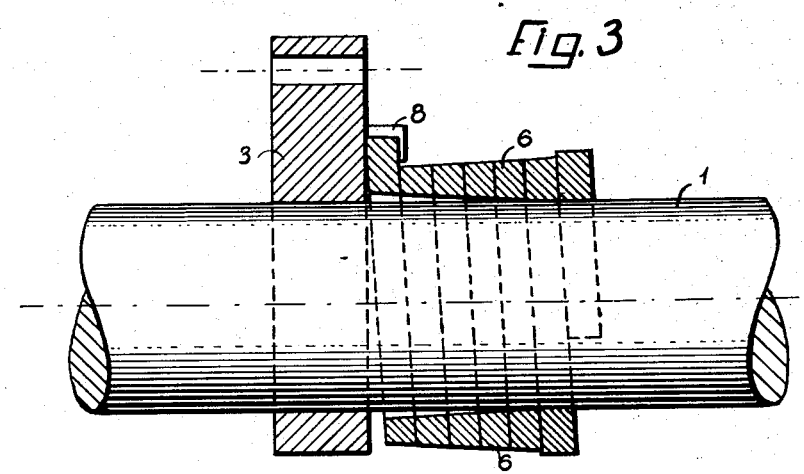
Fig. 3 is an axial longitudinal sectional view of another embodiment of the free-wheel device according to the invention.

1 designates a shaft adapted to be rotated in one direction by a driving member 3 which, in the example shown, is freely mounted on said driven shaft 1 coaxially therewith. The one-way drive is ensured, according to the invention, by means of a generally helical spring 6 also coaxial with shaft 1 and secured at one end on the driving member, e. g. by being locked between two abutments 8—8' (Fig. 2).

In the examples shown, the metal wire of which said spring is made has a 4-angled section and the coils of the springs are juxtaposed.

The inner periphery of the coil spring considered as a whole has a frusto-conical shape at least along a portion of the spring length, said frusto-conical portion being called hereafter a frusto-conical "bore."

The diameter of said frusto-conical bore is a maximum at that end of the spring which is fixed on the driving member.

In the examples shown in Figs. 1 to 4 the frusto-conical bore extends along the whole length of the spring. At rest, the diameter of the frusto-conical bore is smaller than the diameter of the driven shaft only along a portion of the spring length near to its free end which ensures, along said free end portion, a sufficient friction to prepare the progressive coupling between the spring and the shaft.

With this arrangement, it will be understood that the coupling does not take place instantaneously along the whole length of the spring, but so that the spring is progressively wound around the shaft. In the drawings, the conicity of the bore has been strongly exaggerated to illustrate more clearly the principle of the invention. In practice, for a coupling taking place within an angular displacement of about 1°, with dimensions of the spring and shaft shown, the variation of the bore diameter between the secured end and the fixed end of the spring would be of about 1/10 of one millimeter.

On the other hand, the above mentioned conicity ensures a progressive increase of the cross-section of the spring coils towards the free end of the latter, said progressive increase ensuring good conditions of clamping and thence a safe coupling.

Figure 4:
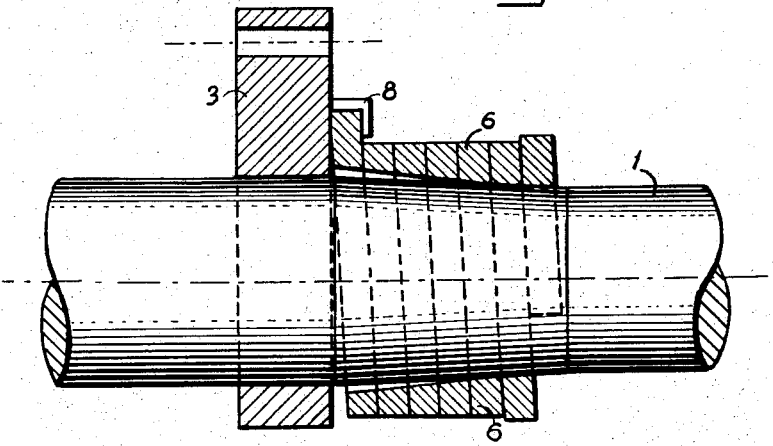
Fig. 4 is a similar view of an alternative embodiment.

In the examples shown in Figs. 1 and 4, the outer surface of the spring is cylindrical and the increase of the cross-section of the coils is merely ensured by the frusto-conical bore.

Alternatively, as shown in Fig. 3, the outer surface of the spring is also frusto-conical, the outer diameter increasing towards the free end of the spring while, as already mentioned, the diameter of the above mentioned frusto-conical bore decreases towards said free end, so that both conicities cooperate to progressively increase the cross-section of the coils towards the free end of the spring.

Finally, since the coils of a spring are never perfectly juxtaposed, in order to prevent the coils from coming nearer to each other when a considerable resisting torque is applied to the driven shaft, which would reduce the clamping action of these coils, in the embodiment shown in Fig. 4, that portion of the shaft around which is wound spring 6 has been given a slight conicity, the diameter of the shaft decreasing towards the free end of the spring as the frusto-conical bore of said spring, the conicity of the shaft being less pronounced than the conicity of the bore, so that the progressive coupling takes place in the same manner as in Figs. 1 to 3. Due to this slight conicity of the shaft, the last coils will tend to be taken apart instead of tending to be brought nearer to one another when considerable resisting torque will be applied to the driven shaft, so that the coupling conditions will be improved instead of being jeopardized.

In the embodiment shown in Figs. 5 and 6, a portion 2 of the driven shaft has a frusto-conical shape, said portion being either made in one piece with driven shaft 1, or secured on said shaft. 3 designates, as previously, the driving member which, as shown at 4 is provided with an antifriction ring. The driving member is freely mounted on shaft 1. Its axial relative position with respect to said shaft is determined on one side by the frusto-conical portion 2 and, on the other side, by a ring 5 acting as an abutment and rotatively fast with shaft 1. 6 designates as previously an helical spring coaxial with shaft 1—2. In the example shown, said spring is constituted by a few juxtaposed coils made of a square steel wire. Its outer periphery is cylindrical, while its inner periphery is bored and ground, so as to provide a frusto-conical bore the conicity of which is at least as pronounced as that of portion 2. That end of the spring which corresponds to the diameter of the bore cone comprises a lug 7 which is locked between two abutments 8 and 9 of the driving member 3. The other end of the spring is free and at least the coils located near said free end suitably clamp the frusto-conical portion 2. Due to the frusto-conical bore of the spring and, since its outer periphery is cylindrical, the cross-section of the wire of which the spring is made will be progressively greater towards the free end of said spring. Since spring 6 clamps the frusto-conical portion 2, this spring will tend to be shifted towards the apex of said conical portion; such a shift, however, is impaired by means of a screw 10 screwed in a small plate 11. Said small plate is rigid with the driving member so that as screw 10 will be screwed down into the small plate 11, the spring will clearly move towards the larger diameter of the frusto-conical portion 2, so that the initial friction of spring 6 on said portion 2 will increase. The initial adjustment thus consists in selecting, by means of screw 10, a predetermined relative axial position of spring 6 with respect to frusto-conical portion 2, according to the desired value of the above-mentioned initial friction it is clear that this adjustment facility also permits to take up wear, if required. These two faces of lug 7 which are in contact with abutments 8 and 9 should be slightly slanting, so that the reaction of lug 7 upon abutment 8 which becomes important when the resisting torque of shaft becomes considerable tends to take lug 7 away from screw 10, thus decreasing the thrust exerted by said lug 7 upon said screw 10. The free-wheel device according to Figs 5 and 6 operates in the same manner as the embodiments shown in Figs. 1 to 4.

While the invention has been described with particular reference to preferred embodiments it is not intended to limit the scope of the invention to the embodiments illustrated, nor otherwise than by the terms of the subjoined claims.

What is claimed is:

1. A one-way driving device comprising, in combination, a driven shaft, a driving member freely mounted on said driven shaft coaxially therewith and a generally helical spring surrounding said driven shaft and having one end coil at least partly in frictional contact therewith and its other end coil connected to said driving member, the inner radius of the coils of said helical spring increasing from said one end coil towards said other end coil of said spring, at least along a portion of its length and the cross-section of the wire of which the spring is made decreasing from said one end coil towards said other end coil of the spring at least along a portion of its length.

2. A one-way driving device comprising, in combination a driven shaft having a frusto-conical portion, a driving member freely mounted on said driven shaft coaxially therewith and a generally helical spring clampingly mounted around said frusto-conical portion of said driven shaft and having at least along a portion of its length a frusto-conical bore and rotatively fast with said driving member at its end corresponding to the greater diameter of said bore, said spring being constituted by a metal wire having a 4-angled cross-section and wound in juxtaposed coils, the cross-section of said wire increasing towards the free end of said spring.

3. A one way driving device comprising, in combination, a driven shaft having a frusto-conical portion, a spiral spring made of a metal wire wound to constitute a plurality of coils surrounding said frusto-conical portion, the end coil of said spring which surrounds the smallest section of said frusto-conical portion being at least partially in frictional contact therewith while the inner radius of the remaining coils increases from said end coil towards the other end coil of said spring so as to afford a uniformly increasing clearance space between said remaining coils and said frusto-conical portion when said device is at rest, a driving member rotatably mounted on said shaft adjacent the largest section of said frusto-conical portion, an axially extending recess formed in the face of said driving member adjacent said other end coil, a radially projecting member carried by said other end coil and engageable in said recess to constitute a driving connection between said driving member and said spring, and adjustable means to retain said radially projecting member in said recess while permitting limited axial displacement of said radially projecting member in said recess and consequently limited axial displacement of said other end coil with respect to said driving member.

References Cited in the file of this patent

UNITED STATES PATENTS

| 532,162 | Lindsay | Jan. 8, 1895 |
| 1,688,691 | Drake | Oct. 23, 1928 |
| 1,870,646 | Pitter | Aug. 9, 1932 |

FOREIGN PATENTS

| 15,925 | Great Britain | July 18, 1904 |
| 645,375 | France | Dec. 7, 1927 |